(12) United States Patent
Mueller

(10) Patent No.: US 6,226,756 B1
(45) Date of Patent: *May 1, 2001

(54) APPARATUS AND METHOD FOR PROVIDING A COMMON SYSTEM INTERFACE FOR PROCESSORS

(75) Inventor: Martin Mueller, Fremont, CA (US)

(73) Assignee: Integrated Device Technology, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/185,126

(22) Filed: Nov. 3, 1998

(51) Int. Cl.[7] ................................ G06F 1/04
(52) U.S. Cl. ................................ 713/500
(58) Field of Search ................. 713/500, 501; 705/23, 28; 395/500.44, 500.48, 500.49

(56) References Cited

U.S. PATENT DOCUMENTS

| | | | |
|---|---|---|---|
| 5,313,618 | * 5/1994 | Pawloski | 703/28 |
| 5,410,726 | 4/1995 | Baqai et al. | 398/800 |
| 5,414,857 | 5/1995 | Jeddeloh et al. | 395/725 |
| 5,473,766 | 12/1995 | Shaver | 395/500 |
| 5,515,514 | 5/1996 | Dhuey et al. | 395/282 |
| 5,551,013 | * 8/1996 | Beausoleil et al. | 703/23 |
| 5,574,894 | * 11/1996 | Iles et al. | 713/500 |
| 5,920,712 | * 7/1999 | Kuijsten | 703/23 |

OTHER PUBLICATIONS

Galileo Technology, *GT–64010 A System Controller with PCI Interface for R4XXX/R5000 Family CPU*, Revision 1.1, p 50.

Motorola, *MPC601 Reference Manual*, Chapter 8, pp 8–31–835.

Integrated Device Technology, Inc., *R4600/R4700 Ref. Manual* Chapters 9 and 10, pp. 9–1,9–2, 94, and 9–5, 10–1–10–3.

Integrated Device Technology, Inc., R5000 Ref. Manual, Chapters 14 and 15, pp. 14–1–14.3, 15–1–15–3.

* cited by examiner

*Primary Examiner*—Thomas M. Heckler
(74) *Attorney, Agent, or Firm*—Pillsbury Winthrop, LLP (57) ABSTRACT

The present invention provides an interface for exchanging clocking signals and other information between a computer subsystem based on a first clocking scheme of a first processor and a second processor. The second processor and computer subsystem are coupled to the interface. The interface may be included on a circuit card that is removably coupled to the computer subsystem. The interface includes an emulator for emulating the first clocking scheme thereby enabling the second processor to function with the computer subsystem.

32 Claims, 6 Drawing Sheets

APPARATUS AND METHOD FOR PROVIDING A COMMON SYSTEM INTERFACE FOR PROCESSORS

BACKGROUND OF THE INVENTION

1. Field of the Invention

This invention relates generally to the field of computer systems and more specifically to a method and apparatus for enabling computer subsystems to function with various processors having different clocking schemes, without the need to implement hardware modifications to the computer subsystem.

2. Background of the Invention

Computer technology product development cycles are shrinking at a rapid rate. Advancements in function and improvements in speed of computer processing systems occur so rapidly that computer technology products are only on the market for a short time period before being rendered obsolete by products with greater functional capabilities and faster processing speeds. As a result, manufacturers of computer processing systems have only a short period of time to recoup design and manufacturing costs.

Computer processing systems frequently include a motherboard. Typically, a motherboard is a printed circuit board (PCB), which is formed from a flat board made of nonconducting material, such as plastic or fiberglass. Typically, a microprocessor chip, other special function chips (such as a math co-processor, memory cache, or graphic accelerator), main memory, support circuitry, I/O bus, CPU bus, bus controllers and connectors are mounted on a motherboard. A common method for mounting a microprocessor onto a motherboard includes physically inserting the microprocessor into a socket or connector attached to the motherboard. The microprocessor is connected to the other elements in the computer processing system via conductors that are printed on the motherboard. Another common method of mounting microprocessors on a motherboard includes soldering the microprocessor chip into holes in the motherboard wherein the holes have been predrilled to hold the pins on the chip. Alternatively, another method includes soldering the microprocessor chip directly to the surface of the motherboard.

Advancements in the capabilities and speeds of computer processing systems are often centered around improved microprocessors. Very-Large-Scale Integration (VLSI) and Large Scale Integration (LSI) engineering techniques allow chip designers to add many complex functions on a single chip. Benefits of including new functions in the microprocessor as opposed to a co-processor or other on-board element include space savings, and, more importantly, faster operating speeds because the processing speeds of the microprocessor are far greater than the communication speeds between elements on the motherboard.

Thus, the microprocessor frequently has to be replaced to provide new functions and faster speeds to a computer processing system. A problem with changing the microprocessor is that it also often requires changes to the other hardware components of the computer processing system on the motherboard (the "subsystem"). The subsystem frequently must be changed to account for differences in the clocking schemes and pin and package configurations of the different processors. Thus subsystem designers must implement a unique subsystem design for each new processor. Such redesign efforts represent large expenditures of time and money.

What is needed is a common interface that will eliminate the difference at the subsystem level between various processors, so that a single hardware subsystem printed circuit board design can support various microprocessors without making changes to the subsystem. A common interface of this type will allow manufacturers to reuse a subsystem design over multiple generation of processors, thereby increasing the time period the subsystem remains a competitive product in the marketplace and increasing the chance that the manufacturer recovers its design expenses related to the subsystem.

SUMMARY OF THE INVENTION

The present invention advantageously permits a computer hardware subsystem design to operate with various processors without changes to the design.

The present invention also advantageously permits the emulation of a clocking scheme of one processor through the operation of a different second processor.

The present invention also advantageously eliminates the time, cost and redesign efforts necessary in the prior art when processors in a computer system are replaced or upgraded.

The present invention also advantageously permits a computer hardware subsystem design to be used with multiple generation of processors thereby increasing the time period the computer hardware subsystem is an active product in the marketplace.

The present invention provides the above advantages, as well as others, through an interface for exchanging clocking signals and other information between a computer subsystem based on a first clocking scheme of a first processor and a second processor. The second processor and computer subsystem are coupled to the interface. The interface may be included on a circuit card that is removably coupled to the computer subsystem. The interface includes an emulator for emulating the first clocking scheme thereby enabling the second processor to function with the computer subsystem.

DETAILED DESCRIPTION OF THE PREFERRED EMBODIMENTS

Figure 1:
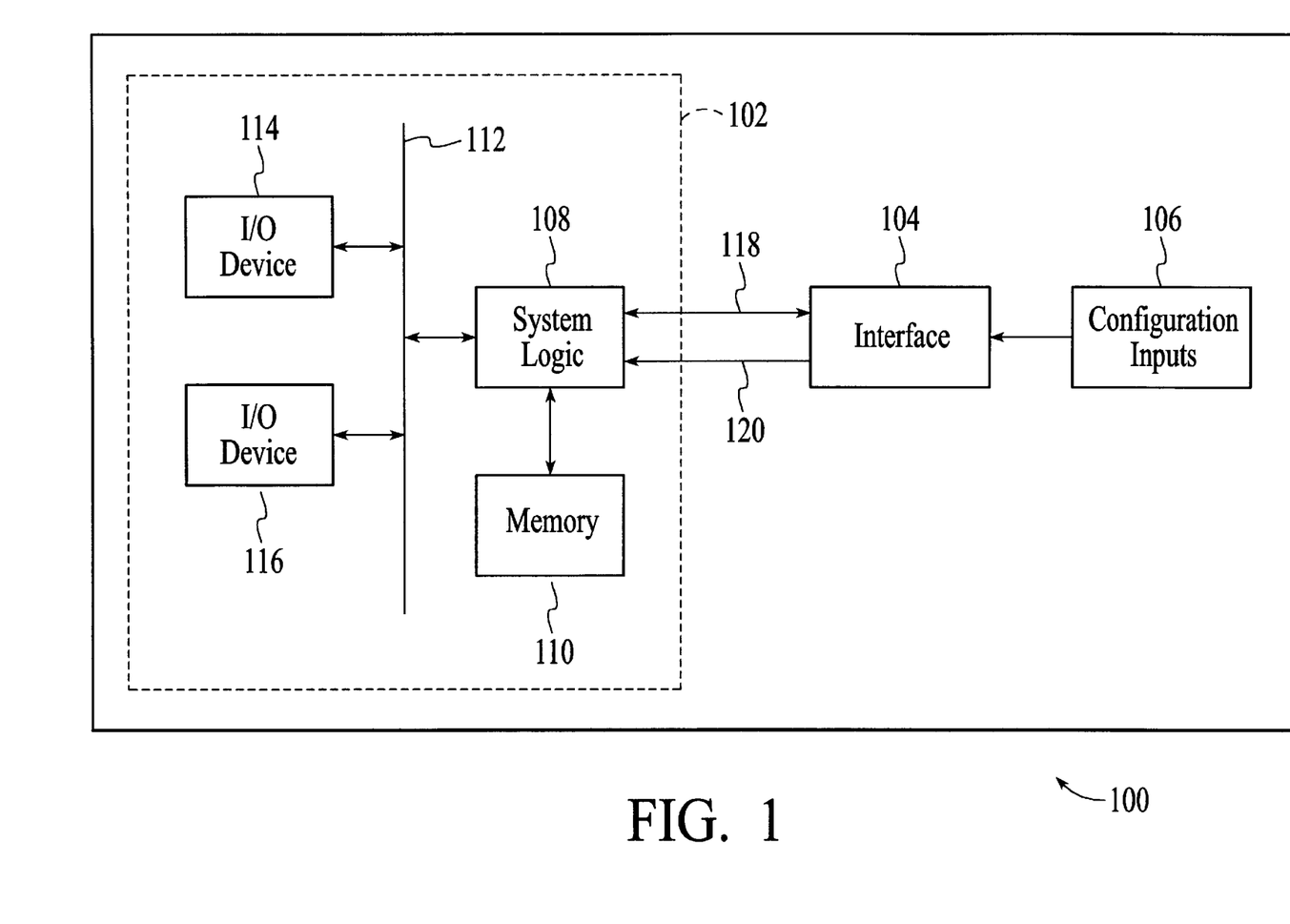
FIG. 1 is a schematic block diagram of a computer system with an interface according to an embodiment of the invention.

Referring in detail now to the drawings wherein similar parts or steps of the present invention are identified by like reference numerals, FIG. 1 illustrates a computer system 100 comprising a computer subsystem 102, an interface 104, and configuration inputs 106. Computer subsystem 102 includes system logic 108 which comprises hardware and software necessary in a computer system excluding a processor.

System logic 108 is coupled to and may reference and/or modify data in memory 110. Memory 110 functions as, for example, data storage space. Typically, memory 110 is an addressable storage space such as random access memory (RAM) or read-only memory (ROM). However, it is understood that memory 110 can include other types of data storage devices including, but not limited to, secondary storage devices such as disks, tapes, and CD-ROMs.

System Logic 108 is coupled to system I/O bus 112 which is further coupled to I/O device 114 and I/O device 116. System I/O bus 112 transfers data between system logic 108 and IO device 114 and/or I/O device 116. System I/O bus 112 is typically a Peripheral Component Interconnect (PCI) bus; however, the specific type of bus architecture may vary depending upon the requirements of computer system 100. Additionally, as known to those skilled in the art, system I/O bus 112 may transfer data to and from one or more I/O devices and may also transfer data directly to and from a processor. I/O device 114 and I/O device 116 are devices for entering data into and/or presenting data from computer system 100. Examples of I/O device 114 or I/O device 116 include printers, keyboards, mouses, tracking balls, joysticks, computer monitors, and secondary storage devices. However, it is understood that any suitable device for performing desired input and/or output functions may be used as an I/O device. Although computer subsystem 102 is illustrated with I/O device 114 and I/O device 116, it is understood by those skilled in the art that computer subsystem 102 may include one or more I/O devices.

Interface 104 is coupled to system logic 108 via CPU bus 118. CPU bus 118 transfers address information, command and control signals, instructions and other data between interface 104 and system logic 108. CPU bus 118 may be any suitable bus capable of transmitting the above signals between interface 104 and system logic 108. Interface 104 is additionally coupled to system logic 108 through CPU clocks bus 120. CPU clocks bus 120 transfers clocking signals from interface 104 to system logic 108. CPU clocks bus 120 may be any suitable bus capable of transferring clocking signals. Interface 104 is further coupled to configuration inputs 106 which provide control and setting information to interface 104. As described more completely below, interface 104 provides computer subsystem 102 with a uniform clocking and reset generation interface across different processors, regardless of the actual clocking and reset generation schemes employed by a certain processor. In particular, interface 104 generates the system clocks for computer subsystem 102. Thus, whether a processor employed by computer system 100 is designed to accept the system clocks or to generate the system clocks, computer subsystem 102 may operate as if the system clocks are generated by the processor employed by computer system 100.

Figure 2:
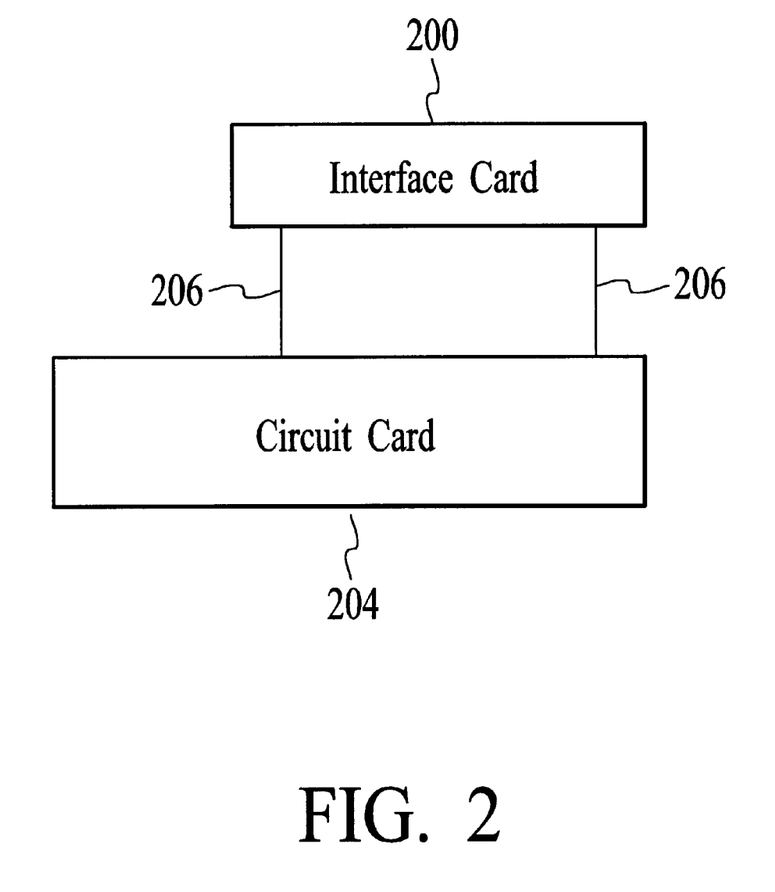
FIG. 2 is a side elevational view of the interface shown in FIG. 1 coupled to a circuit card in accordance with one preferred embodiment of the invention.

FIG. 2 is a side elevational view of an interface card 200 for supporting circuits and components of interface 104, wherein interface card 200 is coupled to a circuit card 204 in accordance with a preferred embodiment of the present invention. Interface card 200 is, for example, a low profile mezzanine circuit card positioned in a plane separated from and substantially parallel to circuit card 204. While interface card 200 is described as a mezzanine circuit card, based on the teachings of the present invention herein, those skilled in the art will understand that interface card 200 may be implemented in a variety of form factors. For example, in an alternate arrangement, circuit card 204 and interface card 200 may be positioned in the same plane. Interface card 200 is connected to circuit card 204 by one or more of the connectors 206. Connector 206 is an electrical and/or mechanical connector or any suitable connector known to those skilled in the art. Circuit card 204 is a printed circuit board containing, for example, the primary circuitry of computer system 100 (FIG. 1) other than the processor, such as main memory, support circuitry, and bus controller and connector.

Common Clocking Scheme

Figure 3:
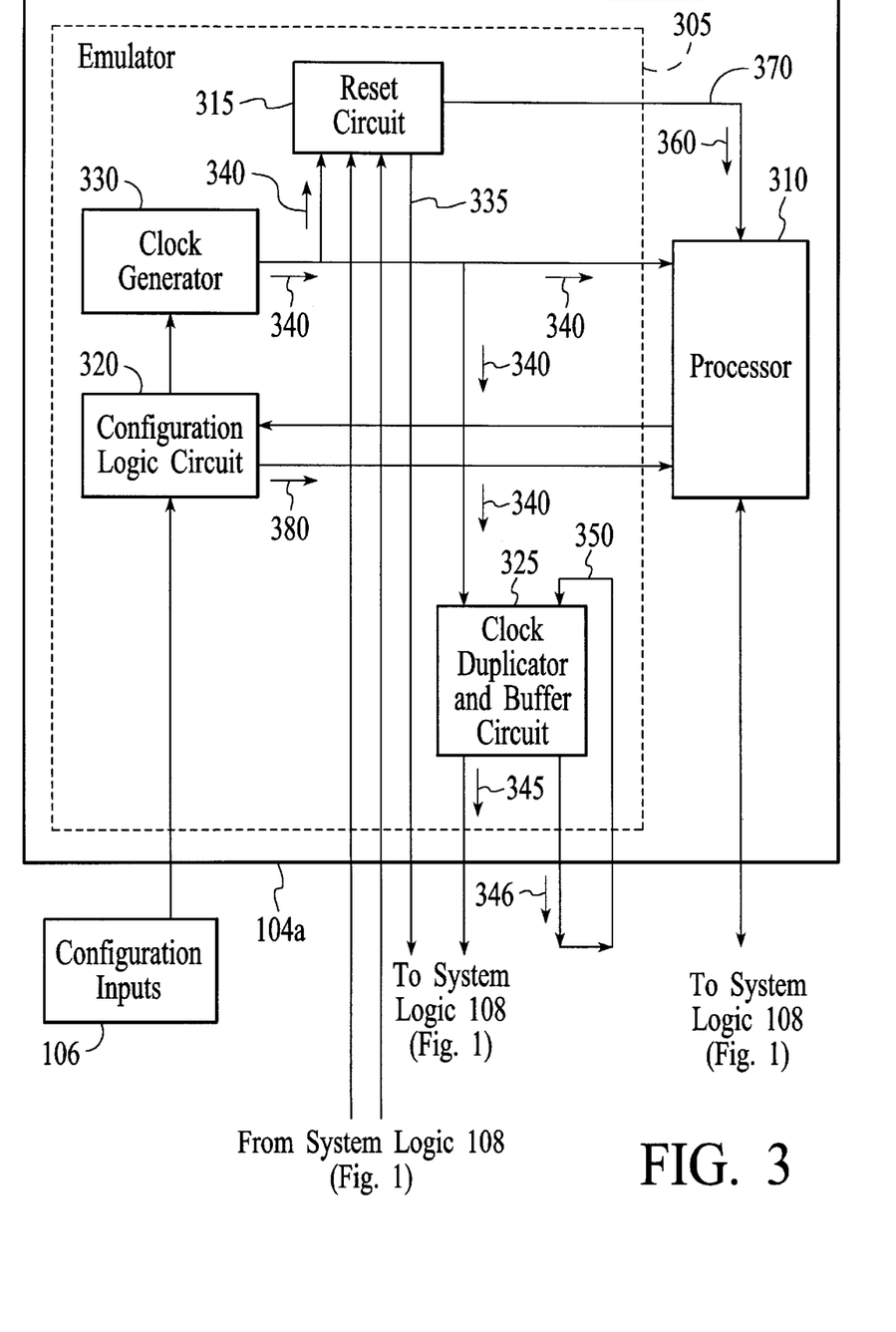
FIG. 3 is a schematic block diagram illustrating an embodiment of the interface shown in FIG. 1 coupled with the configuration inputs in FIG. 1.

FIG. 3 is a schematic block diagram illustration of one embodiment of interface 104 (FIG. 1) coupled with configuration inputs 106 and mounted on interface card 200 in FIG. 2. In this embodiment, interface 104*a* comprises an emulator 305 and a processor 310 which is, for example, a RV4650 64-bit MIPS processor available from Integrated Device Technology, Inc. of Santa Clara, Calif. As appreciated by those skilled in the art based on the teachings of the present invention, a RV4650 64-bit MIPS processor is designed to accept a system clock from, for example, circuitry external to the processor. The RV4650 64-bit MIPS processor uses the system clock as the timing reference for its bus interface, which bus interface may be similar to CPU bus 118 (FIG. 1). The RV4650 64-bit MIPS processor core frequency is generated by an internal phase-locked loop (PLL) (located in processor 310 of FIG. 3) as a multiple of the system clock input. A system clock refers to periodic, accurately spaced timing pulses upon which a computer system uses to synchronize its operations, such as generation of interrupts, sampling, and signal duration control. A PLL is a circuit containing an oscillator whose output phase and or frequency is "steered" to keep in synch with a reference signal, such as a received signal and is also used to multiply the frequency in phase with the received signal.

While processor 310 is described as a RV4650 64-bit MIPS processor, based on the teachings of the present invention herein, those skilled in the art will understand that processor 310 can be any processor with a clocking scheme designed to accept a system clock. For example, processor 310 can also be a RV5000 64-bit MIPS processor, which is also available from Integrated Device Technology, Inc. Further details of the RV4650 64-bit MIPS and RV5000 64-bit MIPS processors may be found in the following references available from Integrated Device Technology, Inc.: IDT79R4640 and IDT79R4650 RISC Processor Hardware User's Manual, IDT79R5000 Data Sheet, and IDT79R5000 Reference Manual. These references are fully incorporated herein by reference thereto as if fully reproduced immediately hereinafter.

Emulator 305 comprises a clock generator 330, a reset circuit 315, a configuration logic circuit 320 and a clock duplicator and buffer circuit 325. Configuration logic circuit 320 provides clock generator 340 with the system bus frequency of computer subsystem 102 (FIG. 1) based upon configuration inputs 106 as described in Table 2. Clock generator 330 produces a clock signal 340 at a predetermined frequency equal to the system bus frequency of computer subsystem 102. Clock generator 330 may include any suitable generator for producing a clock signal, such as a clock oscillator or a PLL based clock generator. Clock signal 340 is provided as input to reset circuit 315, processor 310 and clock duplicator and buffer circuit 325. Because clock signal 340 is at the same frequency as the system bus frequency of computer subsystem 102, clock signal 340 is an appropriate signal to use as a system clock for computer system 100 (FIG. 1). Thus, emulator 305 provides processor 310 with an input clock equivalent to and having the same frequency as a system clock for computer system 100.

Clock duplicator and buffer circuit 325 is, for example, a PLL based clock buffer that multiplies clock signal 340 by one and buffers the result to generate, at the same frequency as the system bus frequency of computer subsystem 102, one or more clock signals 345 and clock signal 346. A portion of the output of clock duplicator and buffer circuit 325 (clock signal 346) is tied to input for clock duplicator and buffer circuit 325 via feedback line 350 as shown in FIG. 3, so that clock duplicator and buffer circuit 325. may perform path delay compensation, that is, align the phase and frequency of output clock signals 345 from clock duplicator and buffer circuit 325 with clock signal 340. The devices on interface 104a are operated in reference to clock signal 340. Clock signal 345 is used to drive the operations of system logic 108. Accordingly, although processor 310 does not generate a system clock, interface 104a provides computer subsystem 102 with one or more system clock inputs via the output clock signals 345 of clock duplicator and buffer circuit 325 as though processor 310 had generated a system clock for computer subsystem 102.

In summary, processor 310 is designed to accept a system clock signal from circuitry external to itself, and computer subsystem 102 is designed to accept a system clock from the processor which operates with the computer subsystem. Emulator 305 satisfies the processor 310 requirement for an externally generated system clock signal and provides computer subsystem 102 a clock signal via interface 104a as though computer subsystem 102 was receiving the system clock signal from processor 310.

Figure 4:
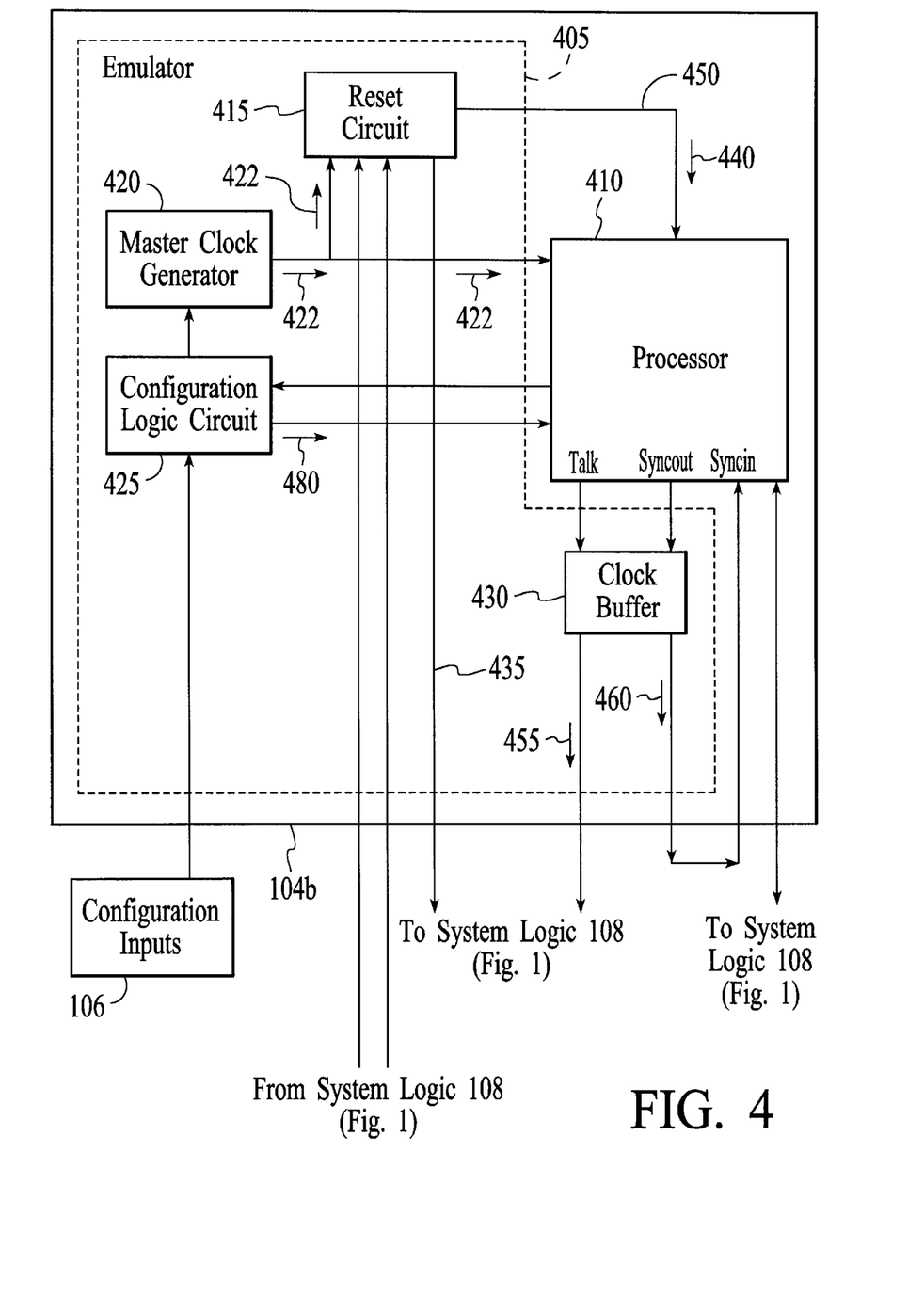
FIG. 4 is a schematic block diagram of an interface in accordance with an embodiment of the invention coupled with the configuration inputs in FIG. 1.

FIG. 4 shows a schematic block diagram illustration of another embodiment of interface 104 (FIG. 1) coupled with configuration inputs 106 and mounted on interface card 200 (FIG. 2). In the embodiment of FIG. 4, interface 104b comprises an emulator 405, a processor 410, a master clock generator 420, a configuration logic circuit 425 and a clock buffer 430. Processor 410 is, for example, a RV4700 64-bit MIPS processor available from Integrated Device Technology, Inc. As appreciated by those skilled in the art, an RV4700 64-bit MIPS processor is designed to generate a system clock (shown as TCLK in FIG. 4). While processor 410 is described as a RV4700 64-bit MIPS processor, based on the teachings of the present invention herein, those skilled in the art will understand that processor 410 can be any processor with a clocking scheme designed to generate a system clock. Further details of the RV4700 64-bit MIPS processor may be found in the following references available from Integrated Device Technology, Inc.: IDT79RV4700 Data Sheet and IDT79R4700 ORION Processor Hardware User's Manual. These references are fully incorporated herein by reference thereto as if fully reproduced immediately hereinafter.

Master clock generator 420 generates masterclock 422, which is a master reference clock signal provided as input to reset circuit 415 and processor 410 as shown in FIG. 4. Processor 410 establishes a processor core frequency through an internal PLL which doubles the frequency of masterclock 422. Processor 410 generates system clocks at a desired frequency by dividing down the processor core frequency by integer multiples. For example, to establish a 50 MHz system clock frequency (i.e., a system bus frequency) with a 150 MHZ processor core frequency, processor 410 must be provided with a masterclock 422 frequency set to 75 MHz and a processor core frequency to system bus frequency clock integer divisor of 3 ((75×2)/3= 50).

Configuration logic circuit 425 provides master clock generator 422 with the desired system bus frequency of computer subsystem 102 (FIG. 1) and the desired system bus frequency to processor core frequency multiplier based upon the configuration inputs 106 as described in Table 2. Master clock generator 420 produces masterclock 422 at a predetermined frequency based on the desired system bus frequency of computer subsystem 102 and the desired system bus frequency to processor core frequency multiplier. This relationship is easily understood by reviewing the example given above. If the desired system bus frequency is 50 MHZ and the desired system bus frequency to processor core frequency multiplier is 3, the processor core frequency is about 150 MHZ as seen above. By definition of processor 410 operation in our example, masterclock 422 is one half the processor core frequency of processor 410 or 75 MHz. Table 1 below illustrates the generated frequency of masterclock 422 dependent on various system bus frequencies and clock multipliers.

TABLE 1

| System bus frequency | clock multiplier | masterclock 422 frequency/ processor 410 core frequency |
|---|---|---|
| 44/45 | x2 | 45/90 |
|  | x3 | 66.6667/133 |
|  | x4 | 87.5/175 |
| 50 | x2 | 50/100 |
|  | x3 | 75/150 |
|  | x4 | 100/200 |
| 60 | x2 | 60/120 |
|  | x3 | 87.5/175 (58.33 actual system bus frequency) |
|  | x4 | Not Supported |
| 66 | x2 | 66.6667/133 |
|  | x3 | 100/200 |
|  | x4 | Not Supported |

Processor 410 provides clock buffer 430 with two output signals as shown in FIG. 4: TCLK and SyncOut. TCLK clocks the output registers of an external agent (such as computer subsystem 102), and may also be a global system clock for any other logic in the external agent. SyncOut is a signal generated by processor 410 at the same frequency as masterclock 422. Clock buffer 430 duplicates one or more copies of TCLK to produce clock signals 455. Clock buffer 430 further copies SyncOut to produce clock signal 460 which is coupled to the SyncIn input of processor 410. When clock signal 460 is connected to SyncIn, processor 410 can compensate for TCLK signal delay and align SyncIn with masterclock 422. Clock buffer 430 is any suitable device capable of duplicating TCLK and routing SyncOut to SyncIn. Interface 104b provides TCLK copies made by clock buffer 430 (i.e., system clocks) to computer subsystem 102. As described above, interface 104b is able to emulate a processor that generates one or more system clock outputs for computer subsystem 102 when processor 410 actually generates only a single system clock output.

FIGS. 3 and 4 illustrate distinct embodiments of interface 104 (FIG. 1) that include different processors with different clocking schemes. However, as explained above, interface 104 presents computer subsystem 102 with a common clocking scheme characterized by interface 104 providing computer subsystem 102 with one or more system clocks.

Configuration

Configuration inputs 106 are static inputs which a user of interface 104 may use to control the operation of the processor included in interface 104. The configuration inputs 106 are implemented by, for example, jumpers or dip switches. In FIGS. 3 and 4, configuration inputs 106 are processed by configuration logic circuit 320 and configuration logic circuit 425, respectively. In FIG. 3, configuration logic circuit 320 provides processor 310 with appropriate configuration signals 380 to achieve the action corresponding to the value of configuration inputs 106. In FIG. 4, configuration logic circuit 425 provides processor 410 with appropriate configuration signals 480 to achieve the action corresponding to the value of configuration inputs 106. Table 2 defines the actions corresponding to various values of configuration inputs 106 for the embodiments of the present invention described in FIG. 3 and FIG. 4. Based on the teachings of the present invention, one skilled in the art will understand that there are various known ways to implement configuration logic circuits 320 and 425 so as to provide configuration signals 380 and 480 based on configuration inputs 106, and so the details there of will not be presented here so as not to obscure the invention.

processor 310. It is appreciated by those skilled in the art that bus 370 is capable of transmitting multiple signals from reset circuit 315 to processor 310. It is understood based on the teachings of the present invention herein that reset circuit 315 and configuration logic circuit 320 and other elements shown in FIG. 3 can be implemented by a single programmable logic device (PLD) or by multiple PLDs. A PLD consists of a collection of logic gates with programmable interconnections that may be used to create custom logic. For example, reset circuit 315 and configuration logic circuit 320 of FIG. 3 can both be incorporated into a PLD device.

Figure 5:
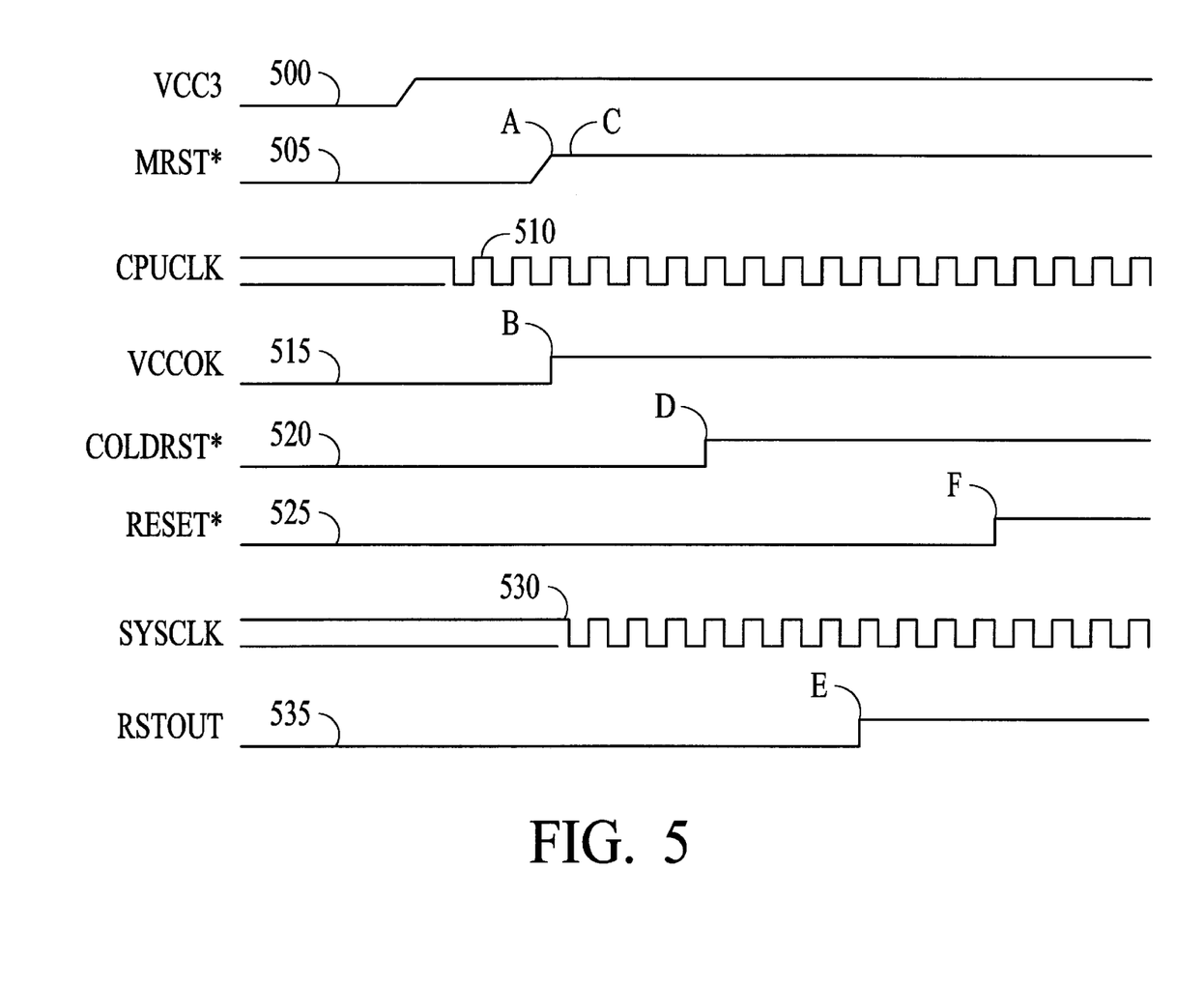
FIG. 5 is a timing diagram showing the reset sequence for the processor shown in FIG. 3.

The timing diagram for a hard reset of processor 310 is illustrated in FIG. 5. At time A, a signal MRST* 505 is driven high, internal to reset circuit 315, at least one hundred milliseconds (100 ms) after a supply voltage VCC3 500 (from a power supply internal to interface 104a in FIG. 3) has reached and stabilized at the suitable output level. For example, if processor 310 is a RV5000 64-bit MIPS

TABLE 2

| Configuration Input | Input Value | Action |
| --- | --- | --- |
| BigEndian | 0 | Configure CPU as Little Endian* |
|  | 1 | Configure CPU as Big Endian** |
| OutDrv | 0 | Set Output drive strength to 100% |
|  | 1 | Set Output drive strength to 83% |
| TimerEn | 0 | Enable CPU internal timer on INT*(5) |
|  | 1 | Disable CPU internal timer on INT*(5) |
| WrType | 0 | R4X00 compatible writes |
|  | 1 | Pipelined writes |
| ClockMult(2:0) | 000 | CPU core frequency is 2X CPU bus frequency |
|  | 001 | 3x |
|  | 010 | 4x |
|  | 011 | 5x |
|  | 100 | reserved |
|  | 101 | reserved |
|  | 110 | Smart Clock mode 0 |
|  | 111 | Smart Clock mode 1 |
| BlkWr(1:0) | 00 | DDDD |
|  | 01 | DxDxDxDx |
|  | 10 | DxxDxxDxxDxx |
|  | 11 | DxxxDxxxDxxxDxxx |
| ClkFreq(2:0) | 000 | 45 MHz |
|  | 001 | 50 MHz |
|  | 010 | 60 MHz |
|  | 011 | 66 MHz |
|  | 100 | 75 MHz |
|  | 101 | reserved |
|  | 110 | reserved |
|  | 111 | reserved |

Reset Generation

A "hard" reset to initializing the system logic and processor in computer system 100 to a predetermined state. For example, system hardware is reset to default values and system logic is set to appropriate initial values—memory size, system device recognition and other system default values. Typically, a hard reset occurs after the power supply to computer system 100 is turned on. As is appreciated by those skilled in the art, other events such as a "push-button" reset can trigger a hard reset. Interface 104 provides system logic 108 with a uniform hard reset signal at least a predetermined number of clock cycles before a processor included in interface 04 becomes stable and ready to execute instructions. This predetermined number of clock cycles allows system logic 108 sufficient time to complete sufficient initialization required for hard reset.

In the embodiment of FIG. 3, reset circuit 315 provides signal 335 to system logic 108 to indicate a hard reset. Reset circuit 315 provides signals 360 (including, for example, VCCOK 515, COLDRST 520, and RESET* 525 in FIG. 5) to processor 310 via bus 370 to produce a hard reset in processor, then the suitable power level is about 3.135 volts. As appreciated by those skilled in the art, the power supply generating supply voltage VCC3 500 is any suitable power supply. A trailing asterisk (*) in a signal name indicates that the identified signal is asserted low and negated high. A signal VCCOK 515 is driven high at time B synchronous to clock signal CPUCLK 510 after signal MRST* is sampled high at time C. A signal COLDRST* 520 is driven high synchronous to clock signal CPUCLK 510 (included, for example, as all or part of clock signal 340 shown in FIG. 3) at time D, which is 256K cycles of clock signal CPUCLK 510 after signal VCCOK 515 is driven high. A signal SYSCLK 530 is generated by a PLL internal to processor 310 which is synchronized to clock signal CPUCLK 510. At time E, 8K cycles of clock signal CPUCLK 510 after signal COLDRST* 520 is driven high, a signal RSTOUT* 535, generated within reset circuit 315, is driven high synchronous to clock signal SYSCLK 530. A signal RESET* 525 is driven high synchronous to clock signal CPUCLK 510 at time F, which is 16K cycles of clock signal CPUCLK 510 after signal COLDRST* 520 is driven high. At time F, the hard reset is complete and processor 310 is able to execute instructions.

Following time E, reset circuit 315 provides system logic 108 with signal 335 which indicates a hard reset to system logic 108. Since time E depicted on FIG. 5 is 8K cycles of clock signal CPUCLK 510 from time D and time F is 16K cycles of clock signal CPUCLK 510 from time D, signal 335 is issued 8K cycles of clock signal CPUCLK 510 prior to completion of the hard reset sequence for Processor 310. As described below, reset circuit 415, in accordance with the embodiment of FIG. 4, presents system logic 108 with a hard reset signal 8K clock cycles prior to completion of the hard reset sequence for processor 410.

Figure 6:
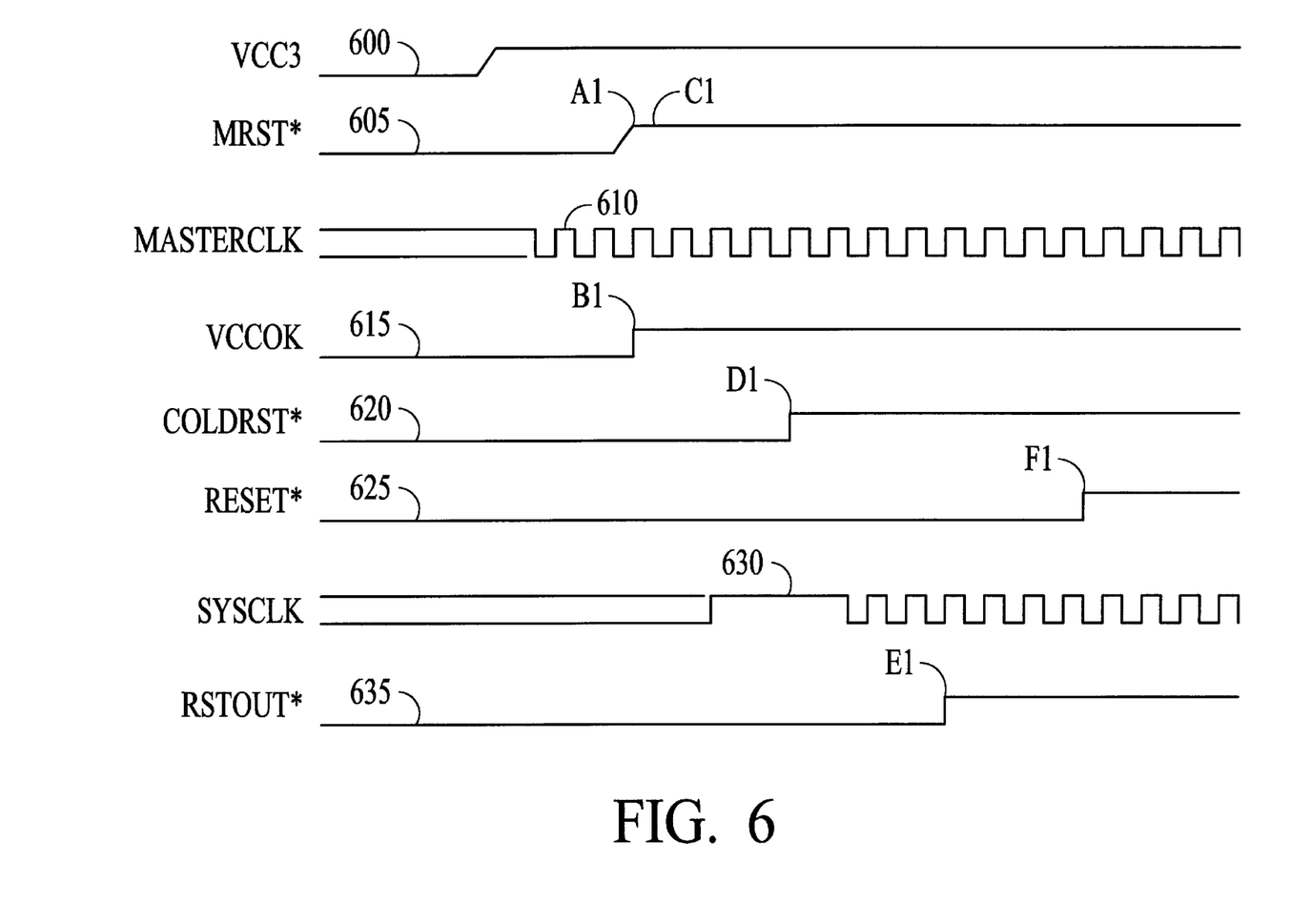
FIG. 6 is a timing diagram showing the reset sequence for the processor shown in FIG. 4.

Table 3 provides additional details of the signals discussed above with respect to a hard reset of processor 310.

fifty six K (256K) clock signal MASTERCLK 610 clock cycles after signal VCCOK 615 is driven high. A clock signal SYSCLK 630 is generated by a PLL internal to processor 410. In FIG. 6, clock signal SYSCLK 630 is depicted in processor core frequency to system bus frequency clock divisor three (3) mode. As is explained above, processor 410 may operate with various integer clock divisors. Clock signal SYSCLK 630 will be provided to system logic 108 through clock buffer 430 as the timing reference for the system bus.

At time E1, 8K cycles of clock signal MASTERCLK 610 after signal COLDRST* 620 is driven high, a signal RSTOUT* 635, generated within reset circuit 415, is driven

TABLE 3

| Signal Name | Description |
| --- | --- |
| MRST* 505 | This signal is internal to Reset Circuit 315. This signal is not driven high until at least 100 ms after VCC3 has stabilized. This signal is self-timed, and it occurs asynchronous to all clocks described below. |
| CPUCLK 510 | Processor clock. This signal is the timing reference for processor 310. The internal frequency for processor 310 is a multiple (minimum: two times, maximum: eight times) of CPUCLK 510 frequency. |
| VCCOK 515 | Processor power good. This signal is driven into processor 310 to indicate that the power supply to the processor has been at the required operating voltage for more than 100 ms, and that it is expected to remain stable. This input must occur synchronous to CPUCLK 510 (i.e., meet set-up and hold time requirements relative to the rising edge CPUCLK 510). |
| COLDRST* 520 | Processor cold reset. This signal in conjunction with VCCOK 515 and RESET* 525 indicates to the processor that a cold, or hard, reset is being performed. This signal must be asserted low with both VCCOK 515 and RESET* 525 to indicate a cold reset. The processor operation is undefined if only COLDRST* 520 is asserted; however, Reset Circuit 315 does not present this condition to processor 310. This input must occur synchronous to CPLCLK 510. |
| RESET* 525 | Processor (warm) reset. This signal when asserted (low) in conjunction with VCCOK 515 low and COLDRST* 520 asserted (low) indicates,that a cold reset is being performed. This signal when asserted alone indicates that a warm reset is being performed. This input must occur synchronous to CPUCLK 510. |
| SYSCLK 530 | System clock. This signal is the timing reference for all transitions/transactions that occur on interface 104a between processor 310 and system logic 108. SYSCLK 530 is generated at the same frequency and aligned into the same phase as CPUCLK 510 by clock duplicator and buffer circuit 325. |
| RSTOUT 535 | System reset. This signal is driven out of reset circuit 315 to reset system logic 108 to a known state. RSTOUT* 535 is generated synchronous to SYSCLK 530. |

The timing diagram for a hard reset of processor 410 is illustrated in FIG. 6. In the embodiment of FIG. 4, reset circuit 415 provides signals 440 (including, for example, VCCOK 615, COLDRST* 620, and RESET* 625 in FIG. 6) to processor 410 via bus 450 to produce a hard reset in processor 410. At time A1, a signal MRST* 605, internal to reset circuit 415, is driven high at least one hundred milliseconds (100 ms) after a supply voltage VCC3 600 (from a power supply internal to interface 104b in FIG. 4) has reached and stabilized at the suitable output level. For example, if processor 410 is a RV4700 64-bit MIPS processor, then the suitable power level is about 3.0 volts. As appreciated by those skilled in the art, the power supply generating supply voltage VCC3 600 is any suitable power supply. A signal VCCOK 615 is driven high at time B1 synchronous to clock signal MASTERCLK 610 (included, for example, as all or part of masterclock 422 shown in FIG. 4) after signal MRST* 605 is sampled high at time C1. A signal COLDRST* 620 is driven high synchronous to clock signal MASTERCLK 610 at time D1, which is two hundred high synchronous to clock signal SYSCLK 630. A signal RESET* 625 is driven high synchronous to clock signal MASTERCLK 610 at time F1, which is 16K cycles of clock signal MASTERCLK 610 after signal COLDRST* 620 is driven high. At time F1, the hard reset is complete and processor 410 is able to execute instructions.

Following time E1, reset circuit 415 provides system logic 108 with signal 435 which indicates a hard reset to system logic 108. Since time E1 depicted on FIG. 6 is 8K cycles of clock signal MASTERCLK 610 from time D1 and time F1 is 16K cycles of clock signal MASTERCLK 610 from time D1, signal 435 is issued 8K cycles of clock signal MASTERCLK 610 prior to completion of the hard reset sequence for Processor 410. Therefore, as described above, interface 104 is able to generate a uniform hard reset signal to system logic 108 at least 8K MASTERCLK 610 clock cycles before the processor included in interface 104 is prepared to execute instructions.

Table 4 provides additional detail of the signals dicussed above with respect to a hand reset of processor 410.

TABLE 4

| Signal Name | Description |
| --- | --- |
| MRST* 605 | This signal is internal to Reset Circuit 415. This signal is not driven high until at least 100 ms after VCC3 has stabilized. This signal is self-timed, and it occurs asynchronous to all described clocks. |
| MASTERCLK 610 | Processor master clock. This signal is the timing reference for processor 410. The internal frequency for processor 410 is two times (2x) MASTERCLK 610 frequency. |
| VCCOK 615 | Processor power good. This signal is driven into processor 410 to indicate that the power supply to the processor has been at the required operating voltage for more than 100 ms, and that it is expected to remain stable. This input must occur synchronous to MASTERCLK 610 (i.e., meet set-up and hold time requirements relative to the rising edge MASTERCLK 610). |
| COLDRST* 620 | Processor cold reset. This signal in conjunction with VCCOK 615 and RESET* 625 indicates to the processor that a cold, or hard, reset is being performed. This signal must be asserted low with both VCCOK 615 and RESET* 625 to indicate a cold reset. The processor operation is undefined if only COLDRST* 620 is asserted; however, Reset Circuit 415 does not present this condition to processor 410. This input must occur synchronous to MASTERCLK 610. |
| RESET* 625 | Processor (warm) reset. This signal when asserted (low) in conjunction with VCCOK 615 low and COLDRST* 620 asserted (low) indicates that a cold reset is being performed. This signal when asserted alone indicates that a warm reset is being performed. This input must occur synchronous to MASTERCLK 610. |
| SYSCLK 630 | System clock. This signal is the timing reference for all transitions/transactions that occur on interface 104b between processor 410 and system logic 108. The SYSCLK 630 is generated by a combination of processor 410 and clock buffer 430. The frequency of SYSCLK 630 is controlled by processor 410 by dividing down the internal processor frequency (2x MASTERCLK 610) by a minimum of two and a maximum of 8. The processor 410 clock output is then buffered by clock buffer 430 to generate SYSCLK 630. |
| RSTOUT 635 | System reset. This signal is driven out of reset circuit 415 to reset system logic 108 to a known state. RSTOUT* 635 is generated synchronous to SYSCLK 630. |

In FIG. 3, processor 310 and subsystem logic 108 both use a system clock generated from the same source (clock generator 330); therefore, system logic 108 could be initialized by some of the same signals that are used to initialize processor 310. In FIG. 4, subsystem logic 108 uses a system clock signal generated by processor 410 (TCLK). In addition, processor 410 does not begin generating signal TCLK until after signal COLDRST* is driven high. Therefore, unlike in FIG. 3, the initialization for subsystem logic 108 must take place at a different time than the initialization of processor 410. By following the hard reset schemes depicted in FIGS. 5 and 6, and generating a hard reset signal to system logic 108 after COLDRST*520 and COLDRST*620, system logic 108 is able to be reset synchronously with the reset of processor 310 or processor 410.

While the invention has been described in connection with what is presently considered to be the preferred embodiments, it is understood that the invention is not limited to the disclosed embodiments. For example, each of the features described above can be used singly or in combination, as set forth below in the claims, without other features described above which are patentably significant by themselves. Accordingly, the present invention is intended to cover various modifications and equivalent arrangements included within the spirit and scope of the appended claims.

What is claimed is:

1. An apparatus for interfacing with a subsystem of a computer system, the computer system functioning based on a first clocking scheme of a first processor, the apparatus comprising:

a circuit card removably coupled to the subsystem;

a second processor having a second clocking scheme attached to said circuit card; and an emulator adapted to communicate with the subsystem when said circuit card is coupled to the subsystem, said emulator emulating said first clocking scheme so that said second processor can function with the subsystem without modification to the subsystem.

2. An apparatus according to claim 1, wherein said circuit card is a mezzanine card.

3. An apparatus according to claim 1, wherein the internal clocking of said second processor is based upon a first clocking signal and said second processor generates a second clocking signal that drives the internal clocking of the subsystem.

4. An apparatus according to claim 3, wherein said second processor is a RV4700 64-bit MIPS processor.

5. An apparatus according to claim 1, wherein said emulator comprises:

a clock generator coupled to said second processor adapted to generate a first clock signal;

a reset circuit coupled to said second processor adapted to reset said second processor; and a configuration logic circuit coupled to said second processor adapted to configure said second processor so that said second processor can function with the subsystem.

6. An apparatus according to claim 5, wherein said emulator further comprises:

a clock buffer coupled to said second processor adapted to buffer a second clock signal and distributing said second clock signal.

7. An apparatus according to claim 5, wherein said reset circuit is further adapted to reset the subsystem.

8. An apparatus according to claim 7, wherein said reset circuit is a programmable logic device.

9. An apparatus according to claim 1, wherein said emulator comprises:

a clock generator coupled to said second processor adapted to generate a first clock signal;

a reset circuit coupled to said second processor adapted to reset said second processor;

a configuration logic circuit coupled to said second processor adapted to configure said second processor; and a clock duplicator and buffer circuit coupled to said clock generator adapted to distribute a second clock signal that is a multiple of said first clock signal.

10. An apparatus according to claim 9, wherein said clock duplicator and buffer circuit is a phased-lock loop based clock buffer.

11. An apparatus according to claim 9, wherein said reset circuit is further adapted to reset the subsystem.

12. An apparatus according to claim 11, wherein said reset circuit is a programmable logic device.

13. An apparatus according to claim 1 wherein the internal clocking of said second processor is based on a first clocking signal and the internal clocking of the subsystem is based on said first clocking signal.

14. An apparatus according to claim 13 wherein said second processor is a RV4650 64-bit MIPS processor.

15. An apparatus according to claim 14 wherein said second processor is a RV5000 64-bit MIPS processor.

16. An apparatus for interfacing with the subsystem of a computer system, the computer system functioning based on a first clocking scheme of a first processor, the apparatus comprising:

a circuit card removably coupled to the subsystem;

a second processor having a second clocking scheme attached to said circuit card; and an emulator adapted to communicate with the subsystem when the circuit card is coupled to the subsystem, said emulator generating at least one output clock signal that emulates said first clocking scheme, said output clock signal being received by the subsystem so that said second processor can function with the subsystem without modification to the subsystem.

17. An apparatus according to claim 16, wherein said circuit card is a mezzanine card.

18. An apparatus according to claim 16, wherein said emulator further comprises a phased-lock loop based clock buffer.

19. An apparatus according to claim 18 wherein the functioning of said emulator is based on a first input into said phased-lock loop clock buffer and the functioning of said subsystem of a computer system is based on a first output of said phased-lock loop clock buffer corresponding to said first input.

20. An apparatus according to claim 16, wherein the internal clocking of said second processor is based upon a first clocking signal and said second processor generates a second clocking signal that drives the internal clocking of the subsystem.

21. An apparatus according to claim 20, wherein said second processor is a RV4700 64-bit MIPS processor.

22. An apparatus according to claim 16 wherein the internal clocking of said second processor is based on a first clocking signal and the internal clocking of the subsystem is based on said first clocking signal.

23. An apparatus according to claim 22 wherein said second processor is a RV4650 64-bit MIPS processor.

24. An apparatus according to claim 22 wherein said second processor is a RV5000 64-bit MIPS processor.

25. An apparatus according to claim 16, wherein said emulator comprises:

a clock generator coupled to said second processor adapted to generate a first clock signal;

a reset circuit coupled to said second processor adapted to reset said second processor; and a configuration logic circuit coupled to said second processor adapted to configure said second processor so that said second processor so that said second processor can function with the subsystem.

26. An apparatus according to claim 25, wherein said reset circuit is further adapted to reset the subsystem.

27. An apparatus according to claim 26, wherein said reset circuit is a programmable logic device.

28. A method for permitting a computer system that operates based upon a first processor having a first clocking scheme to operate based on a second processor having a second clocking scheme, the second processor being removably coupled to a subsystem of the computer system, the method comprising:

performing a hard reset on the second processor;

generating a hard reset signal to the subsystem for at least a predetermined number of clock cycles before completion of said step of performing said hard reset;

providing a clock signal to the second processor;

duplicating said clock signal for input into the subsystem of the computer system.

29. A method according to claim 28 wherein prior to said step of generating a hard reset signal:

asserting a MRST* signal for a predetermined time period after stabilization of a power input signal to the computer system;

based on a clock signal CPUCLK, sampling said MRST* signal at a first predetermined time;

asserting a VCCOK signal at a second predetermined time after said first predetermined time, said VCCOK synchronous with said clock signal CPUCLK;

asserting a COLDRST* signal at a third predetermined time after said second predetermined time; and asserting a RSTOUT signal at a fourth predetermined time after said third predetermined time, said RSTOUT signal synchronous to a system clock signal SYSCLK.

30. A method according to claim 29 wherein following said step of generating a hard reset signal:

asserting a RESET* signal at a fifth predetermined time after said fourth predetermined time, said RESET* signal synchronous to said clock signal CPUCLK .

31. A method for permitting a computer system based on a first processor with a first clocking scheme to operate based on a second processor with a second clocking scheme, the computer system including the subsystem, the second processor being coupled to an emulator which includes a clock generator, the method comprising:

generating a first clock signal from said clock generator at a first frequency value;

generating at least one output clock signal in response to said first clock signal, said each of at least one output clock signal having a frequency value equal to said first frequency value and emulating said first clocking scheme; and driving said at least one output clock signal to the subsystem so that the second processor can function with the subsystem.

32. A method according to claim 31, wherein prior to said step of generating at least one hard reset signal:

asserting a MRST* signal for a predetermined time period after stabilization of a power input signal to the computer system;

based on a clock signal CPUCLK, sampling said MRST* signal at a first predetermined time;

asserting a VCCOK signal at a second predetermined time after said first predetermined time, said VCCOK synchronous with said clock signal CPUCLK;

asserting a COLDRST* signal at a third predetermined time after said second predetermined time; and asserting a RSTOUT signal at a fourth predetermined time after said third predetermined time, said RSTOUT signal synchronous to a system clock signal SYSCLK; and asserting a RESET* signal at a fifth predetermined time after said fourth predetermined time, said RESET* signal synchronous to said clock signal CPUCLK.

* * * * *